Oct. 18, 1927.  1,646,071

J. P. SPANG

MEAT TENDERER

Filed March 20, 1926   3 Sheets-Sheet 1

Inventor
Joseph P. Spang
by Heard Smith & Tennant
Attys.

Oct. 18, 1927.

J. P. SPANG

MEAT TENDERER

Filed March 20, 1926

Inventor.
Joseph P. Spang
by Heard Smith & Tennant
Attys.

Oct. 18, 1927.

J. P. SPANG 1,646,071

MEAT TENDERER

Filed March 20, 1926

Inventor.
Joseph P. Spang
by Heard Smith & Tennant
Attys.

Patented Oct. 18, 1927.

1,646,071

UNITED STATES PATENT OFFICE.

JOSEPH P. SPANG, OF QUINCY, MASSACHUSETTS.

MEAT TENDERER.

Application filed March 20, 1926. Serial No. 96,142.

This invention relates to meat tenderers of the type having rotary knives by which the meat is slit and one of the objects of the invention is to provide a meat tenderer of this type with novel means for giving the knives a positive rotative movement at a rapid rate while they are moving across the meat to be acted on.

Other objects of the invention are to provide a novel construction which facilitates the removal of the knives for cleaning purposes.

Still other objects of the invention are to improve generally meat tenderers in various respects all as will be more fully hereinafter set forth.

In the drawings wherein I have illustrated a selected embodiment of my invention, Fig. 1 is a side view of a device embodying the invention;

Figure 1:
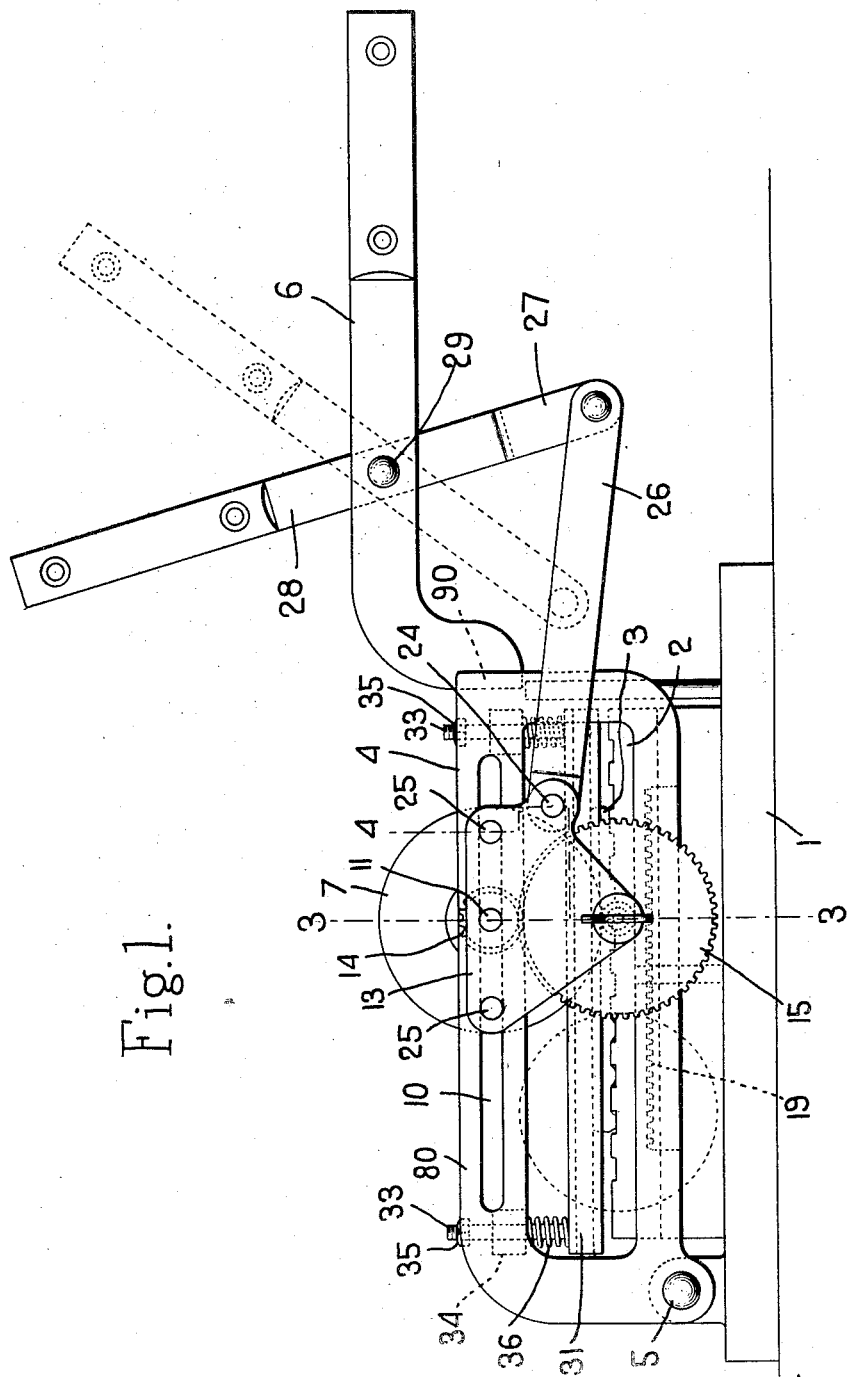
Figure 2:
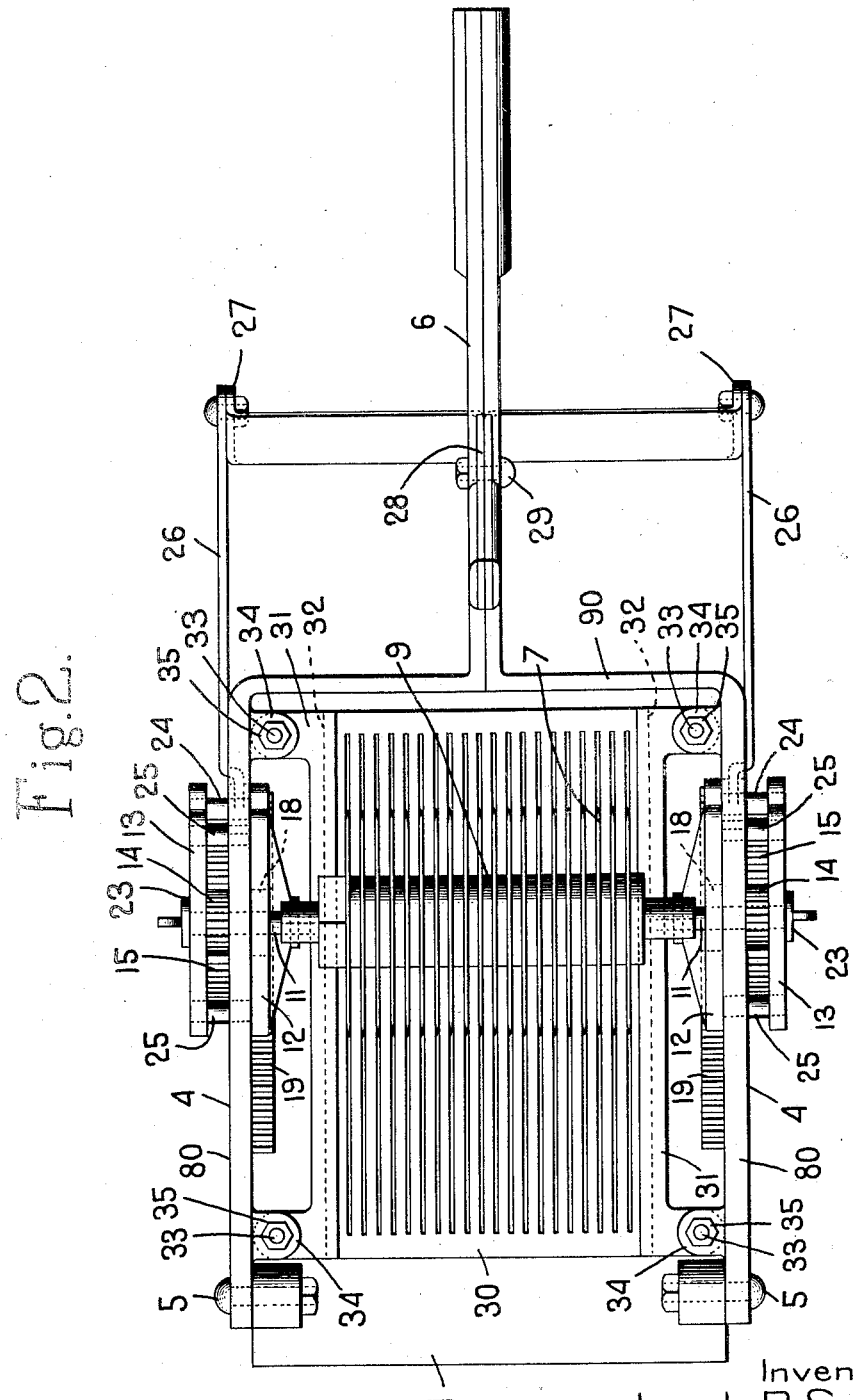
Fig. 2 is a top plan view thereof.
Figure 3:
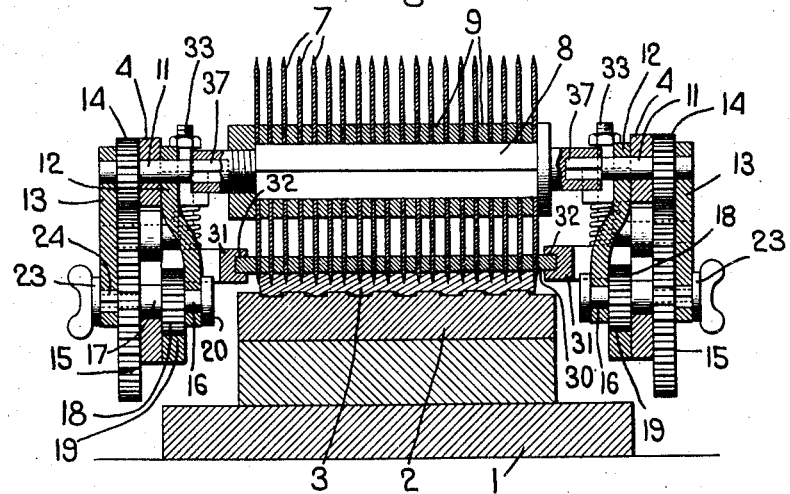
Fig. 3 is a section on the line 3—3, Fig. 1 with the intermeshing gears shown in elevation.
Figure 4:
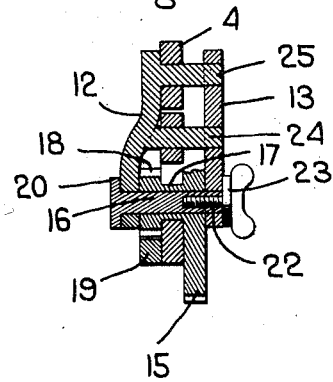
Fig. 4 is a section on the broken line 4—4, Fig. 1.

The device herein shown comprises a base member 1 having a bed 2 on which the piece of meat 3 to be tendered is supported and a knife-carrying frame 4 which is pivoted to the base at 5 and which is provided with a forwardly-projecting handle 6 by which it may be manipulated. The knife-carrying arm may be tipped back about the pivot 5 when a piece of meat or steak 3 is to be placed on the bed 2 and after the meat is in place said knife-carrying arm is swung back into the full line position Fig. 1, in which position the knives are ready for the meat-slitting operation.

The knives herein shown are rotary knives, they being indicated at 7. Any number of knives may be employed and they are shown as mounted on a shaft 8, the knives being separated by suitable spacers 9. This gang of knives is movable back and forth in the knife-carrying frame 4 and one feature of the invention relates to means for rotating the knives rapidly and positively as they are thus reciprocated to perform the meat-slitting operation.

The frame 4 is formed with two side members 80 connected by a bridging member 90 from which the handle 6 extends. Each side member 80 is provided with a slot 10 which forms a guiding slot for the reciprocations of the gang of knives 7.

The shaft 8 carrying the knives is detachably secured at each end to a positively rotated shaft section 11. Each shaft section 11 finds bearing in two supporting plates 12 and 13, the plate 12 being situated on the inside of the side 80 of the frame and the plate 13 being situated on the outside. Each shaft section 11 has a pinion 14 fast thereon which meshes with a gear 15 loosely mounted on a tie rod 16 which extends through the plates 12 and 13 and ties them together.

Said gear 15 is fast on a sleeve 17 which is loosely mounted on the tie rod 16, said sleeve having rigid therewith a gear 18 meshing with a rack 19 carried by the side 80 of the frame. The tie rod 16 is provided at its inner end with a head 20 which engages the inner plate 12 and the outer end of the tie rod where it passes through the outer plate 13 is squared as shown at 21.

22 indicates a headed retaining screw which is screwed into the end of the tie rod and the head 23 of which overlies the outer plate 13, said screw preferably having a wing head so that it can be readily removed or inserted. This screw serves to tie the two plates together and they are held in proper relative position by arms 24 and 25 which are rigid with the inner plate 12 and project through the outer plate 13. There are two arms 25 and these are situated to extend through the slot 10, said arms serving not only to actuate the plates in their reciprocating movement but to maintain them in their proper position. With this construction it will be seen that as the pairs of knife-carrying plates 12 and 13 are reciprocated back and forth the knives will be rapidly rotated because of their geared connection with the stationary racks 19.

For reciprocating the knives back and forth I have provided two links 26, the rear ends of which are pivoted to the two arms 24 and the front ends of which are connected to the two arms 27 on the lower end of an operating lever 28 that is pivoted to the handle 6 at 29. As the operating lever 28 is moved from the full to the dotted line position Fig. 1 the pairs of plates 12 and 13 and the knife gang will be moved back and forth on the frame and during such back and forth movement the knives will be rapidly rotated and will thus slit the meat.

Associated with the knives is a combined clamping and stripper plate 30, the latter having slits through which the knives extend each being removably carried by two yieldingly mounted holders 31. Each holder 31 is provided with a groove 32 in its inner face and the stripper plate is slidably mounted in the grooves. Each holder 31 is provided at each end with an upstanding rod 33 which extends up through a boss 34 carried by the frame 4, each rod having a nut 35 screw-threaded thereto. Each rod is also surrounded by a spring 36 which is confined between the boss 34 and the holder 31. Said springs provide a yielding backing for the stripper plate and serve to yieldingly clamp the latter against the meat.

In order to facilitate the cleaning of the knives the knife shaft 8 is made separable from the shaft sections 11. Each shaft section is shown as having a squared inner end 37 which sets into a squared recess in the end of the knife shaft 8, this construction locking the shaft 8 of the shaft sections 11 together for rotative movement.

When it is desired to remove the knife section 8 for cleaning purposes the two retaining screws 22 are removed thus permitting the outer plates 13 to be taken off and when this is done then the two shaft sections 11 may be withdrawn and removed from the shaft section 8. This frees the knives so that they can be readily taken out from the frame and cleaned. When the knives have been removed the stripper plate may then be pulled out of the holders 31 and thus removed from the machine for cleaning purposes.

This operation of removing the knives and stripper plate and replacing them in the machine can be quickly accomplished.

I have, therefore, provided a simple apparatus in which rotary knives are used that are positively driven by high speed and also in which the stripper plate and knives can be readily removed for cleaning purposes.

I claim:

1. In a meat tenderer, the combination with a bed on which meat to be tendered is supported, of a knife-carrying frame mounted for movement toward and from the bed, a knife carrier supported entirely by the frame and reciprocably mounted thereon, a gang of rotary knives carried by said knife carrier, means to reciprocate the knife carrier on the frame, and gearing by which the knives are rotated by the reciprocating movement of the carrier.

2. In a meat tenderer, the combination with a frame, of a knife carrier reciprocably mounted thereon, a gang of rotary knives carried by said knife carrier, a rack stationarily mounted on the frame, an actuating lever pivoted to the frame and connected to the knife carrier for reciprocating the latter, and gearing carried by said knife carrier and connecting the rack with the knives, whereby reciprocation of the knife carrier gives positive rotary movement to the knives.

3. In a meat tenderer, the combination with a frame, of a knife carrier reciprocably mounted thereon, a gang of rotary knives carried by said knife carrier, a rack stationarily mounted on the frame, an actuating lever pivoted to the frame and connected to the knife carrier for reciprocating the latter, and speed-increasing gearing carried by said knife carrier and connecting the rack with the knives, whereby reciprocation of the knife carrier gives positive rotation to the knives at a relatively high speed.

4. In a meat tenderer, the combination with a frame, of a knife carrier reciprocably mounted on the frame, two shaft sections mounted in said knife carrier, a gang of rotary knives operatively connected to said shaft sections to be rotated thereby, means for reciprocating the knife carrier on the frame, and means for giving rotative movement to the shaft sections as the knife carrier is reciprocated, said shaft sections being separable from the knife carrier to permit ready removal of the latter from the frame.

5. In a meat tenderer, the combination with a frame, of a knife carrier reciprocably mounted on the frame, two shaft sections mounted in said knife carrier, a gang of rotary knives operatively connected to the shaft sections to be rotated thereby, two racks carried by the frame, gearing connecting said racks and the shaft sections, whereby reciprocation of the knife carrier gives rotative movement to the shaft sections and knives, said shaft sections being separable from the knives to permit ready removal of the latter.

6. In a meat tenderer, the combination with a bed to receive the meat to be tendered, of a frame having two side members, a pair of connected plates slidably mounted on each side member, a shaft section carried by each pair of plates, a rack carried by each side member and the frame, gearing connecting each rack with each shaft section, a gang of rotary knives operatively connected to the shaft sections, and means to reciprocate the pairs of plates on said frame.

7. In a meat tenderer, the combination with a bed to receive the meat to be tendered, of a frame having two side members, a pair of connected plates slidably mounted on each side member, a shaft section carried by each pair of plates, a rack carried by each side member and the frame, gearing connecting each rack with each shaft section, a gang of rotary knives operatively connected to the shaft sections, and means to reciprocate the pairs of plates on said frame, each shaft section being separable from the gang of knives to permit the ready removal of the latter.

8. In a meat tenderer, the combination with a supporting bed to receive the meat to be tendered, of a frame, a knife carrier reciprocably mounted thereon, said knife carrier having a gang of rotary knives mounted in the knife carrier, means to reciprocate the knife carrier, means to rotate the knives as the knife carrier is reciprocated, said knives being detachable from the knife carrier, a yieldingly-mounted stripper plate removably carried by the frame and having slots through which the knives operate.

In testimony whereof, I have signed my name to this specification.

JOSEPH P. SPANG.